US012785927B2

(12) United States Patent
Amato et al.

(10) Patent No.: US 12,785,927 B2
(45) Date of Patent: Nov. 3, 2026

(54) DATA AUTHENTICITY AND INTEGRITY CHECK FOR DATA SECURITY SCHEMES

(71) Applicant: Micron Technology, Inc., Boise, ID (US)

(72) Inventors: Paolo Amato, Treviglio (IT); Daniele Balluchi, Cernusco Sul Naviglio (IT); Danilo Caraccio, Milan (IT); Niccolò Izzo, Vignate (IT); Marco Sforzin, Cernusco Sul Naviglio (IT)

(73) Assignee: Micron Technology, Inc., Boise, ID (US)

( * ) Notice: Subject to any disclaimer, the term of this patent is extended or adjusted under 35 U.S.C. 154(b) by 560 days.

(21) Appl. No.: 18/215,479

(22) Filed: Jun. 28, 2023

(65) Prior Publication Data

US 2024/0007265 A1 Jan. 4, 2024

Related U.S. Application Data

(60) Provisional application No. 63/357,509, filed on Jun. 30, 2022.

(51) Int. Cl.
*H04L 9/06* (2006.01)
*G06F 21/64* (2013.01)
*H04L 9/32* (2006.01)

(52) U.S. Cl.
CPC ............ *H04L 9/0618* (2013.01); *G06F 21/64* (2013.01); *H04L 9/32* (2013.01)

(58) Field of Classification Search
CPC ....... H04L 9/0618; H04L 9/32; H04L 9/3234; H04L 9/3242; G06F 21/64
See application file for complete search history.

(56) References Cited

U.S. PATENT DOCUMENTS 6,148,368 A * 11/2000 DeKoning .......... G06F 12/0866 711/E12.019
11,687,273 B2 6/2023 Confalonieri et al.
2006/0174156 A1* 8/2006 Balasubramanian ........................ G06F 11/1666 711/E12.019
2008/0046039 A1* 2/2008 Corndorf ............ H04L 63/0853 607/60
2009/0157973 A1* 6/2009 Li ........................ G06F 3/0656 711/133
2019/0013086 A1* 1/2019 Spencer .............. G06F 13/1673
2020/0322126 A1* 10/2020 Driscoll ................ H04L 1/0041
(Continued)

OTHER PUBLICATIONS

U.S. Appl. No. 17/831,433, filed Jun. 2, 2022, titled "Write Command Execution for Data Protection and Recovery Schemes", 42 pages.

*Primary Examiner* — Matthew T Henning
(74) *Attorney, Agent, or Firm* — Brooks, Cameron & Huebsch, PLLC

(57) ABSTRACT

A memory system can be provided with error detection capabilities at various levels and authentication and integrity check capabilities in parallel with data security schemes. The error detection capabilities can check for any errors not only on data paths within a memory controller, but also on data stored in memory devices. The authentication capabilities provided in parallel with the data security schemes can ensure/strengthen data integrity of the memory system to be compliant with standardized requirements and/or protocols, such as trusted execution engine security protocol (TSP).

20 Claims, 9 Drawing Sheets

(56) References Cited

U.S. PATENT DOCUMENTS

| | | | | |
|---|---|---|---|---|
| 2021/0349790 | A1* | 11/2021 | Wang | G06F 11/1088 |
| 2021/0390024 | A1* | 12/2021 | Durham | G06F 21/79 |

* cited by examiner

DATA AUTHENTICITY AND INTEGRITY CHECK FOR DATA SECURITY SCHEMES

PRIORITY INFORMATION

This application claims the benefit of U.S. Provisional Application No. 63/357,509, filed on Jun. 30, 2022, the contents of which are incorporated herein by reference.

TECHNICAL FIELD

The present disclosure relates generally to semiconductor memory and methods, and more particularly, to apparatuses, systems, and methods related to data authenticity and integrity check for data security schemes.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Figure 1:
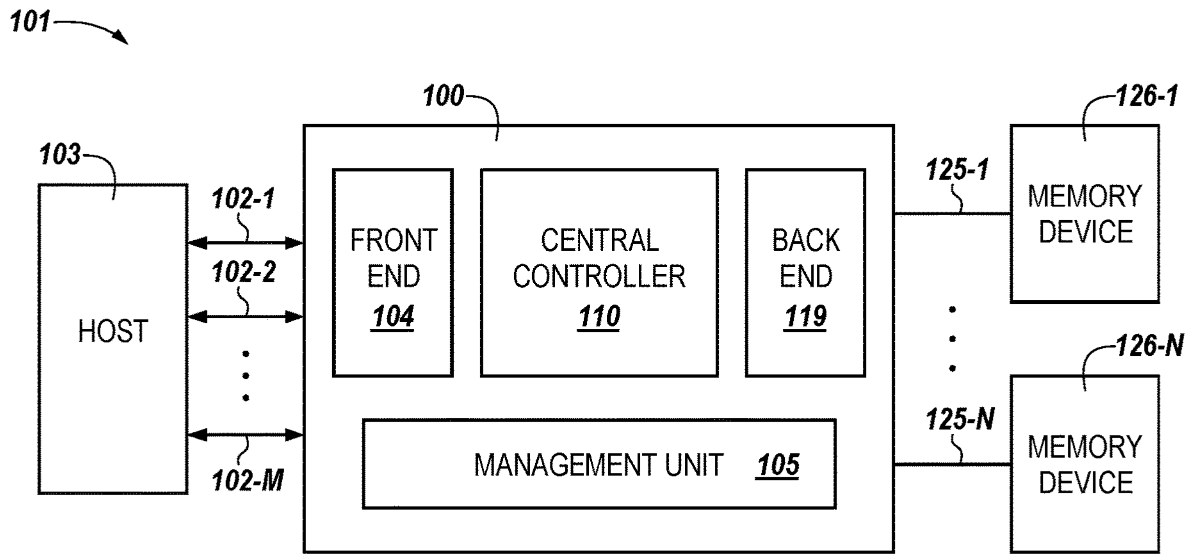
FIG. 1 is a functional block diagram of a computing system including a memory controller in accordance with a number of embodiments of the present disclosure.

Systems, apparatuses, and methods related to data authenticity and integrity check for data security schemes are described. Embodiments are directed to the addition of data authentication and integrity check capabilities (along with strengthened error detection capabilities) to ensure/strengthen data integrity and data reliability associated with operation of a memory system.

In some embodiments, the error detection capabilities can be provided at various levels of the memory system. In one example in which the memory controller is implemented with a cache as an architectural prerequisite, the error detection capability can be provided at a cache line-level to ensure the reliability of data communicated between the memory controller and the memory devices. In another example, the error detection capability can be provided at a host access request-level (e.g., read and/or write commands) to ensure the reliability of data stored in or read from the memory devices by the memory controller (e.g., upon requests by the host).

In some embodiments, the data authentication and integrity check capabilities can be provided to the memory system using various authentication schemes, such as message authentication code (MAC), although embodiments are not so limited. MAC can detect whether there have been any undesired changes in message content (e.g., MAC-protected data) as originally transferred from an authenticated sender. If the change is detected, the MAC triggers uncorrectable error(s) (alternatively referred to as "poison") and a receiver is notified of the detection. Accordingly, an attacker may only have a 1-in-2^n chance of escaping the detection with n-bit MAC (e.g., 1-in-2^28 chance with 28-bit MAC), which is the case even if the attacker is able to perform an infinite number of attempts.

The authentication code can be efficient against various attacks, including row hammer attacks. Row hammer attacks generally refer to security exploits that take advantage of an unintended and undesirable side effect in which memory cells interact electrically between themselves by leaking their charges, possibly changing the contents of nearby memory rows that were not addressed in the original memory access.

Protecting a memory system against row hammer attacks by using a MAC can reduce an attacker's probability of success (e.g., successfully escaping the detection provided by MAC), and can take a substantially long time to successfully corrupt the victim data even if the attacker is assumed to be able to perform brute-force attacks (e.g., infinite number of attempts) on the MAC-protected memory system. For example, if each attempt (being a Bernoulli trial) to generate a "message collision" of the MAC using a different input (to ultimately lead to the row hammer attacks) can take 40 microseconds, it can take up to 2.8 hours (e.g., 40 microseconds*2∞=2.8 hours) to corrupt the victim data of the memory system protected by 28-bit MAC, which provides sufficient time for a host and/or an owner of the memory system to respond.

To ensure data confidentiality, embodiments of the present disclosure provide such data authentication and integrity check capabilities in combination with data security schemes, which can often be provided in the form of cryptographic encryption/decryption, such as an advanced encryption standard (AES) algorithm. Therefore, the data authentication and integrity check capabilities and the data security schemes can operate as complementary to each other. The memory system with such authentication and integrity check schemes can be compliant with various requirements/protocols, such as Trusted execution engine Security Protocol (TSP).

As used herein, the singular forms “a”, “an”, and “the” include singular and plural referents unless the content clearly dictates otherwise. Furthermore, the word “may” is used throughout this application in a permissive sense (i.e., having the potential to, being able to), not in a mandatory sense (i.e., must). The term “include,” and derivations thereof, mean “including, but not limited to.” The term “coupled” means directly or indirectly connected. It is to be understood that data can be transmitted, received, or exchanged by electronic signals (e.g., current, voltage, etc.) and that the phrase “signal indicative of [data]” represents the data itself being transmitted, received, or exchanged in a physical medium.

The figures herein follow a numbering convention in which the first digit or digits correspond to the drawing figure number and the remaining digits identify an element or component in the drawing. Similar elements or components between different figures may be identified by the use of similar digits. For example, 110 may reference element “10” in FIG. 1, and a similar element may be referenced as 210 in FIG. 2. Analogous elements within a Figure may be referenced with a hyphen and extra numeral or letter. See, for example, elements 102-1, 102-2, 102-M in FIG. 1. Such analogous elements may be generally referenced without the hyphen and extra numeral or letter. For example, elements 102-1, 102-2, 102-M may be collectively referenced as elements 102. As used herein, the designators “M” and “N”, particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a functional block diagram of a computing system 101 including a memory controller 100 in accordance with a number of embodiments of the present disclosure. The memory controller 100 can include a front end portion 104, a central controller portion 110, and a back end portion 119. The computing system 101 can include a host 103 and memory devices 126-1, . . . , 126-N coupled to the memory controller 100.

The front end portion 104 includes an interface and interface management circuitry to couple the memory controller 100 to the host 103 through input/output (I/O) lanes 102-1, 102-2, . . . , 102-M and circuitry to manage the I/O lanes 102. There can be any quantity of I/O lanes 102, such as eight, sixteen, or another quantity of I/O lanes 102. In some embodiments, the I/O lanes 102 can be configured as a single port.

In some embodiments, the memory controller 100 can be a compute express link (CXL) compliant memory controller. The host interface (e.g., the front end portion 104) can be managed with CXL protocols and be coupled to the host 103 via an interface configured for a peripheral component interconnect express (PCIe) protocol. CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface.

The central controller portion 110 can include and/or be referred to as data management circuitry. The central controller portion 110 can control, in response to receiving a request from the host 103, performance of a memory operation. Examples of the memory operation include a read operation to read data from a memory device 126 or a write operation to write data to a memory device 126.

The central controller portion 110 can generate error detection information and/or error correction information based on data received from the host 103. The central controller portion 110 can perform error detection operations and/or error correction operations on data received from the host 103 or from the memory devices 126.

As used herein, the term “error correction information” refers to information that can be used to correct a number of errors within data. More particularly, the error correction information can identify which bit of the data corresponds to an “error” (e.g., needs to be error-corrected). Further, as used herein, the term “error correction operation” refers to an operation to correct one or more errors within data. In a number of embodiments, the error correction operation can be performed using the error correction information.

As used herein, the term “error detection information” refers to information that can be used to indicate whether data has one or more errors or not, which may not further indicate which bit position of the data needs to be error-corrected. Further, as used herein, the term “error detection operation” refers to an operation to indicate whether data has one or more errors. In a number of embodiments, the error detection operation can be performed using the error detection information; therefore, the error detection operation performed on the data may not precisely indicate which bit of the data needs to be error-corrected.

An example of an error detection operation is a cyclic redundancy check (CRC) operation. CRC may be referred to as algebraic error detection. CRC can include the use of a check value resulting from an algebraic calculation using the data to be protected. CRC can detect accidental changes to data by comparing a check value stored in association with the data to the check value calculated based on the data.

Figure 2:
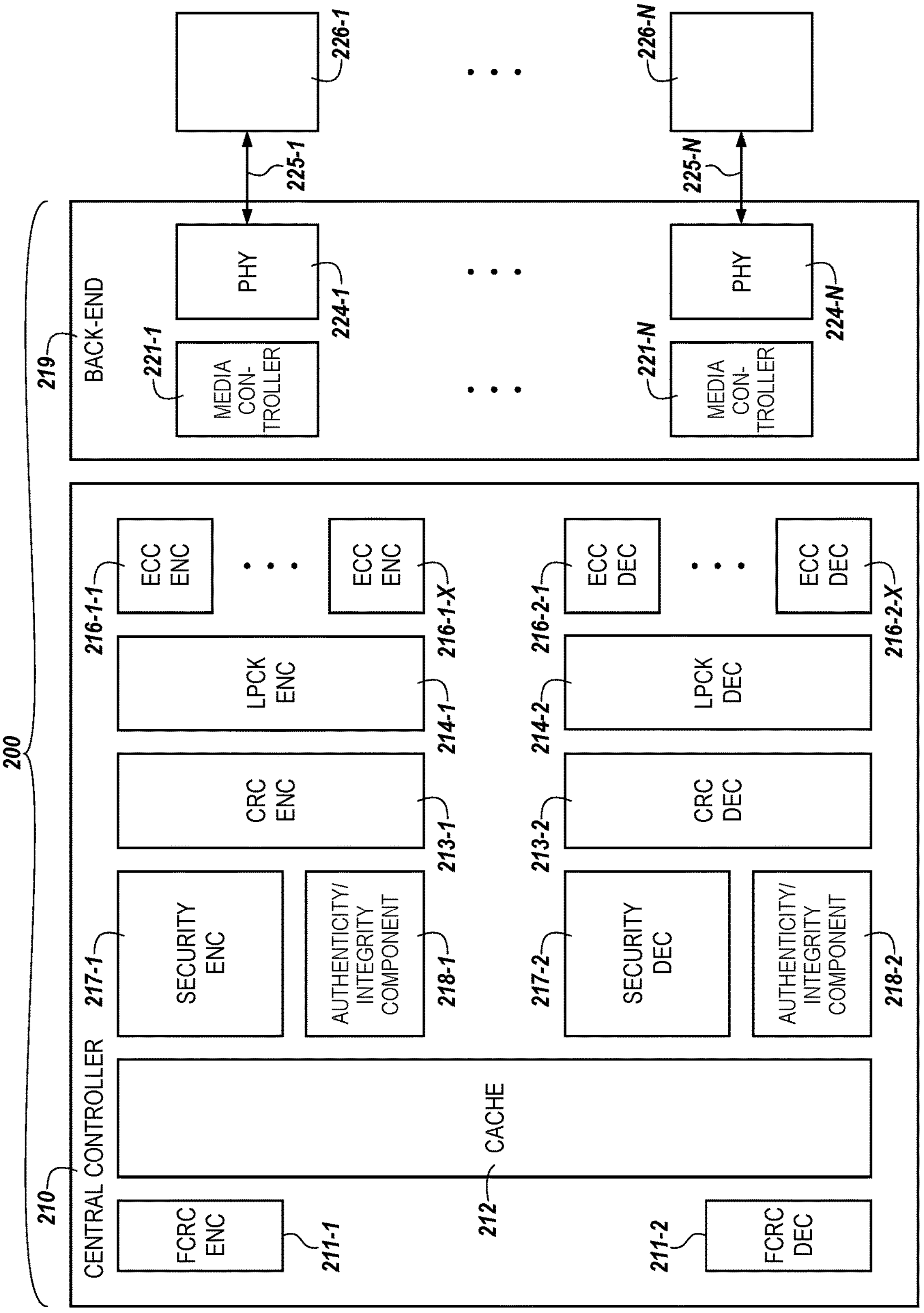
FIG. 2 is a functional block diagram of a memory controller having an authenticity/integrity component and error detection components in one configuration in accordance with a number of embodiments of the present disclosure.
Figure 3:
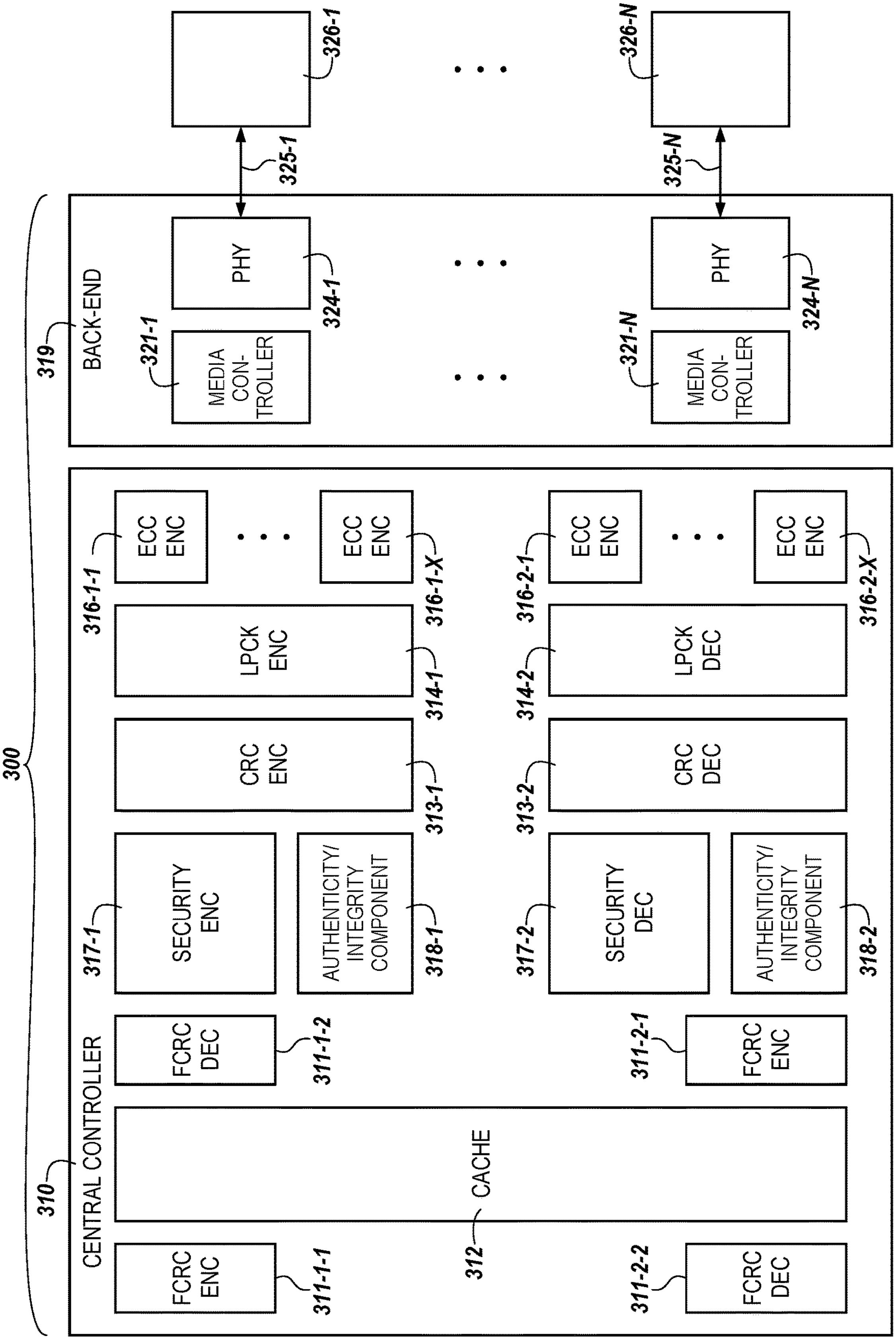
FIG. 3 is a functional block diagram of a memory controller having an authenticity/integrity component and error detection components in another configuration in accordance with a number of embodiments of the present disclosure.

An error correction operation can be performed to provide error correction capabilities with various granularities. In one example, an error correction operation, when performed (e.g., at the ECC decoders 216-2 and/or 316-2 as illustrated in FIGS. 2 and 3, respectively), can provide an error correction capability of correcting a particular quantity of (e.g., bit) errors, while further providing an error detection capability of detecting errors (without correcting those) beyond the particular quantity. While this error correction capability may not be capable of protecting a memory device 226 from its complete failure, another error correction operation, such as a chip kill operation, can provide an error correction capability to restore a memory device 126 despite of its complete failure.

A chip kill operation protects the memory system even if a constituent chip (e.g., the memory device 126) is damaged; thereby, avoiding a situation of one of the chips being a single point of failure (SPOF) of the memory system. Often, the chip kill capability is provided through various error correction code (ECC) schemes including a "Redundant Array of Independent Disks" (RAID) scheme, a low-power chip kill (LPCK) scheme, etc., which allow data recovery of the damaged chip by reading all of the constituent chips of the memory system.

The chip kill can involve parity data (e.g., RAID parity or LPCK parity) that are specifically designed for data recovery of the damaged chip. The user data that share the same parity data can be referred to as being grouped together.

The back end portion 119 can include a media controller and a physical (PHY) layer that couples the memory controller 100 to the memory devices 126. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can include channels 125-1, . . . , 125-N. The channels 125 can include various types data buses, such as a sixteen-pin data bus and a two-pin data mask inversion (DMI) bus, among other possible buses.

An example of the memory devices 126 is dynamic random access memory (DRAM) operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). In at least one embodiment, at least one of the memory devices 126-1 is operated as an LPDDRx DRAM device with low-power features enabled and at least one of the memory devices 126-N is operated an LPDDRx DRAM device with at least one low-power feature disabled. In some embodiments, although the memory devices 126 are LPDDRx memory devices, the memory devices 126 do not include circuitry configured to provide low-power functionality for the memory devices 126 such as a dynamic voltage frequency scaling core (DVFSC), a sub-threshold current reduce circuit (SCRC), or other low-power functionality providing circuitry. Providing the LPDDRx memory devices 126 without such circuitry can advantageously reduce the cost, size, and/or complexity of the LPDDRx memory devices 126. By way of example, an LPDDRx memory device 126 with reduced low-power functionality providing circuitry can be used for applications other than mobile applications (e.g., if the memory is not intended to be used in a mobile application, some or all low-power functionality may be sacrificed for a reduction in the cost of producing the memory).

Data can be communicated between the back end portion 119 and the memory devices 126 primarily in forms of a memory transfer block (MTB) that includes a number of user data blocks (UDBs). As used herein, the term "MTB" refers to a group of UDBs that are grouped with a same parity data block (PDB) (e.g., share a same PDB); therefore, are transferred together from a cache (e.g., the cache 212) and/or memory devices 126 for each read or write command. For example, the group of UDBs of the same MTB can be transferred to/from (e.g., written to/read from) the memory devices 126 via the channels 126 over a predefined burst length (e.g., a 32-bit BL) that the memory controller 100 operates with. A burst is a series of data transfers over multiple cycles, such as beats. As used herein, the term "beat" refers to a clock cycle increment during which an amount of data equal to the width of the memory bus may be transmitted. For example, 32-bit burst length can be made up of 32 beats of data transfers.

As used herein, the term "PDB" refers to a data block containing parity data (e.g., LPCK parity data in forms of one or more parity symbols) configured for a chip kill (e.g., LPCK) operation on UDBs that are grouped with the PDB. As further described herein, an MTB can be in a plain text or cypher text form depending on whether the MTB has been encrypted at the memory controller 100 (e.g., the security encoder 217-1 and/or 317-1).

As used herein, the term "UDB" refers to a data block containing host data (e.g., received from the host 103 and alternatively referred to as user data). In some embodiments, host data included in an UDB can be in forms of one or more data symbols (e.g., multi-bit symbols), which can be a non-binary symbol. For example, non-binary symbol(s) having N bits can be one of $2^N$ elements of a finite Galois field.

An MTB can be a unit of read access to the memory devices 126. For example, even when a host read command (e.g., read command received from the host 103) is received to readjust one UDB, all the other data blocks (e.g., UDBs and/or PDB) that are grouped together with the UDB (e.g., requested by the host read command) can be transferred to the memory controller 100. As described further herein, the data blocks that are transferred together can be used for a chip kill operation at the memory controller 100 and just the UDB requested by the host read command can be further sent to the host 103. In some embodiments, the MTB read from the memory devices 126 can be stored in a cache (e.g., the cache 212 illustrated in FIG. 2), from which a requested UDB can be further sent to the host 103.

An MTB can also be a unit of write access to the memory devices 226. For example, when a host write command to update one of UDBs of an MTB is received at the memory controller 100, the memory controller 100 reads the MTB from the memory devices 126 or the cache 212, update the UDB as well as a PDB of the MTB, and write the updated MTB back to the memory devices 126 and/or the cache 212.

Along with the MTB, a PDB can be also transferred between the back end portion 119 and the memory devices 126. The host data or the parity data of a single UDB or PDB can correspond to multiple codewords (e.g., 64 codewords).

Along with the MTB, other "extra" bits of data (e.g., other data in addition to data corresponding to an MTB) can also be transferred between the back end portion 119 and the memory devices 126. The extra data can include data used to correct and/or detect errors in MTB and/or authenticate and/or check data integrity of the MTB, and/or metadata, although embodiments are not so limited. Further details of the extra bits are illustrated and described in connection with FIGS. 2-5.

In some embodiments, some (e.g., one or more) memory devices 126 can be dedicated for PDBs. For example, memory devices configured to store UDBs can be different from a memory device (e.g., one or more memory devices) configured to store PDBs.

In some embodiments, the memory controller 100 can include a management unit 105 to initialize, configure, and/or monitor characteristics of the memory controller 100. The management unit 105 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

FIG. 2 is a functional block diagram of a memory controller 200 having an authenticity/integrity component (e.g., an authenticity/integrity check encoder/decoder 218-1/218-2 that are respectively shown as "AUTHENTICITY/INTEGRITY ENC" 218-1 and "AUTHENTICITY/INTEGRITY DEC" 218-2 in FIG. 2) and a pair of front-end CRC encoder/decoder 211 (alternatively referred to and shown as "FCRC" in FIG. 2) in one configuration in accordance with a number of embodiments of the present disclosure. The memory controller 200, the back end portion 219, and the memory devices 226 illustrated in FIG. 2 are analogous to the memory controller 100, the back end portion 119, and the memory devices 126 illustrated in FIG. 1.

The central controller portion 210 includes a FCRC encoder 211-1 (e.g., paired with a FCRC decoder 211-2) to generate error detection information (e.g., alternatively referred to as end-to-end CRC (e2e CRC)) based on data (e.g., corresponding to an UDB and in "plain text" form) received as a part of a write command (e.g., received from the host 103) and before writing the data to the cache 212. As used herein, an UDB in plain text form can be alternatively referred to as an "unencrypted UDB", which can be further interchangeably referred to as a "decrypted UDB" or an "unencrypted version of an UDB".

The error detection information generated at the FCRC encoder 211-1 can be a check value, such as CRC data. Read and write commands of CXL memory systems can be a size of UDB, such as 64 bytes. Accordingly, the data received at the FCRC encoder 211-1 can correspond to an UDB.

The central controller portion 210 includes a cache 212 to store data, error detection information, error correction information, and/or metadata associated with performance of the memory operation. An example of the cache 212 is a thirty-two (32) way set-associative cache including multiple cache lines. While read and write commands of CXL memory systems can be a size of an UDB (e.g., 64 bytes), the cache line size can be equal to or greater than a size of an UDB. For example, the cache line size can correspond to a size of an MTB. In an example where an MTB includes 4 UDBs (with each UDB being a 64-byte chunk), for example, each cache line can include 256 bytes of data.

Data (e.g., UDBs and/or MTB) stored in the cache 212 can be further transferred to the other components (e.g., a security encoder 217-1 and/or an authenticity/integrity check encoder 218-1) of the central controller portion 210 (e.g., as part of cache writing policies, such as cache writeback and/or cache writethrough) to be ultimately stored in the memory devices 226 to synchronizes the cache 212 and the memory devices 226 in the event that the data received from the host (e.g., the host 103 illustrated in FIG. 1) have not been written to the memory devices 226 yet.

Use of the cache 212 to store data associated with a read operation or a write operation can increase a speed and/or efficiency of accessing the data because the cache 212 can prefetch the data and store the data in multiple 64-byte blocks in the case of a cache miss. Instead of searching a separate memory device in the event of a cache miss, the data can be read from the cache 212. Less time and energy may be used accessing the prefetched data than would be used if the memory system has to search for the data before accessing the data.

The central controller portion 210 further includes a security encoder 217-1 (e.g., paired with a security decoder 217-2) to encrypt data before transferring the data to a CRC encoder 213-1 (to write the data to the memory devices 226). Although embodiments are not so limited, the pair of security encoder/decoder 217 can operate using an AES encryption/decryption (e.g., algorithm). Once encrypted at the security encoder 217-1, the data that were used to be in plain text form can be in (e.g., converted to) cypher text form. As used herein, the UDB in cypher text form can be alternatively referred to as an "encrypted UDB", which can be alternatively referred to as an "encrypted version of an UDB". In some embodiments, the security encoder/decoder 217 can be selectively enabled/disabled to transfer data between the memory devices 226 and the memory controller 200 without encrypting/decrypting the data.

The central controller portion 210 further includes an authenticity/integrity check encoder 218-1 to generate authentication data based on data received from the cache 212. Although embodiments are not so limited, the authentication data generated at the authenticity/integrity check encoder 218-1 can be MAC, such as KECCAK MAC (KMAC) (e.g., SHA-3-256 MAC).

In some embodiments, the MAC generated at the authenticity/integrity check encoder 218-1 can be calculated based on trusted execution environment (TEE) data (alternatively referred to as "TEE flag"), Host Physical Address (HPA) (e.g., a memory address used/identified by the host 103 illustrated in FIG. 1 in association with host read/write transactions), a security key identifier (ID) that are associated with a physical address (of the memory devices 226) to be accessed for executing a host write command.

The security encoder 217-1 and the authenticity/integrity check encoder 218-1 can operate in parallel. For example, the data stored in the cache 212 and that are in plain text form can be input (e.g., transferred) to both the security encoder 217-1 and the authenticity/integrity check encoder 218-1. In some embodiments, a security key ID can be further input (along with the data in plain text form) to the security encoder 217-1. Further, in some embodiments, a security key ID, TEE flag, and an HPA associated with a host write command can be further input (along with the data in plain text form) to the authenticity/integrity check encoder 218-1.

The central controller portion 210 includes a CRC encoder 213-1 (e.g., paired with a CRC decoder 213-2) to generate error detection information (e.g., alternatively referred to as cache line CRC (CL CRC)) based on data received from the security encoder 217-1. The data transferred to the CRC encoder 213-1 from the security encoder 217-1 can be in cypher text form as the data were previously encrypted at the security encoder 217-1. The error detection information generated at the error detection information generator 213-1 can be a check value, such as CRC and/or checksum data. The CRC encoder 213-1 and CRC decoder 213-2 can operate on data (e.g., MTB) having a size equal to or greater than a cache line size.

The central controller portion 210 includes low-power chip kill (LPCK) encoder 214-1 (e.g., paired with an LPCK decoder 214-2) to generate and/or update LPCK parity data (e.g., a PDB) based on data received from the CRC encoder 213-1. The data transferred to the LPCK encoder 214-1 from the CRC encoder 213-1 can be in cypher text form as the data were encrypted at the security encoder 217-1. The LPCK encoder 214-1 can update the PDB (e.g., that were previously generated for an MTB stored in the memory devices 226) to conform to new UDB received as part of a write command from the host. To update the PDB, all of the UDBs of an MTB (to which the new UDB corresponds) can be transferred (e.g., by the memory controller 200) to the LPCK encoder 214-1, which can update (recalculate) the PDB based on comparison (e.g., one or more XOR operations) among the UDBs of the MTB and the new UDB received from the host. In some embodiments, the MTB (including not only the updated PDB and the new UDB, but also the other UDBs that are not "new") can be transferred to the memory devices 226 to be rewritten entirely. In some embodiments, only a portion of the MTB that are subject to changes (e.g., the updated PDB and the new UDB) can be transferred to the memory devices 226 to be written, which eliminates a need to performance of a read-modify-write of the whole MTB to the memory devices 226; thereby, reducing a power associated with writing the updated PDB and the new UDB.

As shown in FIG. 2, the central controller portion 210 can include ECC encoders 216-1-1, . . . , 216-1-X configured to generate ECC data based on data transferred from the LPCK encoder 214-1. The data transferred to each ECC encoder 216-1 can be in cypher text form as the data were previously encrypted at the security encoder 217-1.

Each ECC encoder 216-1 can be responsible for a respective region of the memory devices 226, such as a memory die, although embodiments are not so limited. As an example, if there are five memory devices 226 with each including two memory dice, the memory controller 200 can include ten ECC encoders 216-1 (as well as ten ECC decoders 216-2) such that ECC data generated at each of the ten ECC encoders 216-1 can be written (e.g., along with user data used to generate the ECC data) to a respective memory die.

Each ECC encoder 216-1 can be paired with a respective one of ECC decoders 216-2-1, . . . , 216-2-X to operate in a collective manner and to be dedicated for each memory device 216 and/or each memory die of the memory devices 216. For example, an ECC encoder 216-1-1 that can be responsible for one memory die of the memory device 226-1 can be grouped with an ECC decoder 216-2-1 that is also responsible for the memory die, which allows ECC data that were generated at the ECC encoder 216-1-1 to be later transferred to the ECC decoder 216-2-1 for performing an error correction operation on data (e.g., MTB) stored in the memory die.

The MTB along with "extra" bits of data can be transferred to the back end portion 219 to be ultimately written to the memory devices 226. The "extra" bits can include LPCK parity data generated at the LPCK 214-1 (e.g., in forms of a PDB), error detection information generated at the FCRC encoder 211-1 and/or 213-1, parity data (e.g., symbols) generated at the LPCK encoder 214-1, error correction information generated at the ECC encoders 216-1 (e.g., alternatively referred to as ECC data), and/or authentication data generated at the authenticity/integrity check encoder 218-1 that are associated with the MTB as well as metadata and/or TEE data. As described herein, data corresponding to an MTB can be written to the memory devices in cypher text form.

As shown in FIG. 2, the memory controller 200 can include a back end portion 219 coupled to the central controller portion 210. The back end portion 219 can include media controllers 221-1, . . . , 221-N. The back end portion 219 can further include PHY memory interfaces 224-1, . . . , 224-N. Each physical interface 224 is configured to be coupled to a respective memory device 226.

The media controllers 221-1, . . . , 221-N can be used substantially contemporaneously to drive the channels 225-1, . . . , 225-N concurrently. In at least one embodiment, each of the media controllers 221 can receive a same command and address and drive the channels 225 substantially contemporaneously. By using the same command and address, each of the media controllers 221 can utilize the channels 225 to perform the same memory operation on the same memory cells.

As used herein, the term "substantially" means that the characteristic need not be absolute, but is close enough so as to achieve the advantages of the characteristic. For example, "substantially contemporaneously" is not limited to operations that are performed absolutely contemporaneously and can include timings that are intended to be contemporaneous but due to manufacturing limitations may not be precisely contemporaneously. For example, due to read/write delays that may be exhibited by various interfaces (e.g., LPDDR5 vs. PCIe), media controllers that are utilized "substantially contemporaneously" may not start or finish at exactly the same time. For example, the memory controllers can be utilized such that they are writing data to the memory devices at the same time regardless of whether one of the media controllers commences or terminates prior to the other.

The PHY memory interfaces 224 can be an LPDDRx memory interface. In some embodiments, each of the PHY memory interfaces 224 can include data and DMI pins. For example, each PHY memory interface 224 can include sixteen data pins and two DMI pins. The media control circuitry can be configured to exchange data with a respective memory device 226 via the data pins. The media control circuitry can be configured to exchange error correction information, error detection information, and or metadata via the DMI pins as opposed to exchanging such information via the data pins. The DMI pins can serve multiple functions, such as data mask, data bus inversion, and parity for read operations by setting a mode register. The DMI bus uses a bidirectional signal. In some instances, each transferred byte of data has a corresponding signal sent via the DMI pins for selection of the data. In at least one embodiment, the data can be exchanged contemporaneously with the error correction information and/or the error detection information. For example, 64 bytes of data (e.g., UDB) can be exchanged (transmitted or received) via the data pins while 64 bits of the extra bits are exchanged via the DMI pins. Such embodiments reduce what would otherwise be overhead on the data input/output (e.g., also referred to in the art as a "DQ") bus for transferring error correction information, error detection information, and/or metadata.

The back end portion 219 can couple the PHY layer portion to respective memory devices 226-1, 226-2, . . . , 226-(N−1), 226-N. The memory devices 226 each include at least one array of memory cells. In some embodiments, the memory devices 226 can be different types of memory. The media control circuitry can be configured to control at least two different types of memory. For example, the memory devices 226-1, 226-2 can be LPDDRx memory operated according to a first protocol and the memory devices 226-(N−1), 226-N can be LPDDRx memory operated according to a second protocol different from the first protocol. In such an example, the first media controller 221-1 can be configured to control a first subset of the memory devices 226-1 according to the first protocol and the media controller 221-N can be configured to control a second subset of the memory devices 226-N according to the second protocol.

Data (e.g., an MTB) stored in the memory devices 226 can be transferred to the back end portion 219 to be ultimately transferred and written to the cache 212 and/or transferred to the host (e.g., the host 103 illustrated in FIG. 1). In some embodiments, the MTB is transferred in response to a read command to access the MTB (e.g., transfer the MTB to the host) and/or to synchronize the cache 212 and the memory devices 226 to clean up "dirty" data in the cache 212.

Along with an MTB, other "extra" bits of data can be transferred to the back end portion 219 as well. The "extra" bits can include LPCK parity data generated at the LPCK 214-1 (e.g., in forms of a PDB), error detection information generated at the FCRC encoder 211-1 and/or 213-1, parity data (e.g., symbols) generated at the LPCK encoder 214-1, ECC data generated at the ECC encoders 216-1, and authentication data generated at the authenticity/integrity check encoder 218-1 that are associated with the MTB as well as metadata and/or TEE data. As described herein, the MTB transferred to the back end portion 219 can be in cypher text form.

Data transferred to the back end portion 219 can be further transferred to the respective ECC decoders 216-2. At each ECC decoder 216-2, an error correction operation can be performed on a respective subset of the MTB to correct error(s) up to a particular quantity and detect errors beyond particular quantity without correcting those. In one example, each ECC decoder 216-2 can use the error correction information to either correct a single error or detect two errors (without correcting two errors), which is referred to as a single error correction and double error detection (SECDED) operation. In another example, each ECC decoder 216-2 can use the error correction information (e.g., alternatively referred to as ECC data) to either correct a two error or detect three errors (without correcting three errors), which is referred to as a double error correction and triple error detection (DECTED) operation.

As described herein, each ECC decoder 216-2 can also be responsive for a respective region of the memory devices 226 as the ECC encoder 216-1 is. For example, if the ECC decoder 216-2-1 is responsible for one memory die of the memory device 226-1, the ECC data and a subset of the MTB stored in that memory die can be transferred to the ECC decoder 216-2-1. Therefore, each subset of the MTB can be individually checked for any errors at respective ECC decoders 216-2. In some embodiments, pairs of ECC encoder/decoder 216 can be selectively enabled/disabled to transfer data between the memory devices 226 and the memory controller 200 without generating error correction information and/or performing an error correction operation using the pairs.

Subsequent to error correction operations performed respectively at the ECC decoders 216-2, the MTB can be further transferred to the LPCK decoder 214-2 along with a corresponding PDB (previously generated at the LPCK encoder 214-1). At the LPCK decoder 214-2, the LPCK parity data can be used to perform a chip kill operation (e.g., an LPCK operation) on the MTB received from the memory devices 226. The LPCK protection against any single memory device 226 (chip) failure and/or multi-bit error from any portion of a single memory chip can be implemented collectively across subsets of the memory devices 226 (e.g., LPCK can be provided for a first subset of the memory devices 226-1 and separately for a second subset of the memory devices 226-N) or across all of the memory devices 226.

An example chip kill implementation for a memory controller 200 including five channels 225 coupled to five memory devices 226 can include writing an MTB with four UDBs to four of the five memory devices 226 and PDB to one of the five memory devices 226. Four codewords can be written, each composed of five four-bit symbols, with each symbol belonging to a different memory device 226. A first codeword can comprise the first four-bit symbol of each memory device 226, a second codeword can comprise the second four-bit symbol of each memory device 226, a third codeword can comprise the third four-bit symbol of each memory device 226, and a fourth codeword can comprise the fourth four-bit symbol of each memory device 226. The three parity symbols can allow the LPCK circuitry 214 to correct up to one symbol error in each codeword and to detect up to two symbol errors. If instead of adding three parity symbols, only two parity symbols are added, the LPCK circuitry 214 can correct up to one symbol error but only detect one symbol error.

In some embodiments, the data symbols and the parity symbols can be written or read concurrently from the memory devices 226. If every bit symbol in a memory device 226 fails, only the bit symbols from that memory device 226 in the codeword will fail. This allows memory contents to be reconstructed despite the complete failure of one memory device 226. LPCK is considered to be "on-the-fly correction" because the data is corrected without impacting performance by performing a repair operation (e.g., chip kill operation). For example, the PDB is transferred to the memory controller 200 from the memory devices 226 along with the MTB, which eliminates a need to separately transfer the PDB when a chip kill operation is needed, which, therefore, does not impact performance in performing the chip kill operation. The LPCK encoder 214-1 and/or the decoder 214-2 can include combinational logic that uses a feedforward process.

Subsequent to an LPCK operation performed at the LPCK decoder 214-2, the MTB can be further transferred to the CRC decoder 213-2 along with at least the error detection information previously generated at the CRC encoder 213-1. At the CRC decoder 213-2, an error detection operation can be performed to detect any errors in the MTB using the error detection information, such as CRC data.

Subsequent to an error detection operation performed at the CRC decoder 213-2, the MTB can be further transferred to the security decoder 217-2 and the authenticity/integrity check decoder 218-2 along with at least the authentication data previously generated at the authenticity/integrity check encoder 218-1. At the security decoder 217-2, the data (e.g., MTB) can be decrypted (e.g., converted from the cypher text back to the plain text as originally received from the host). The security decoder 217-2 can use an AES decryption to decrypt the data.

The data that were decrypted at the security decoder 217-2 can be input (in plain text form) to the authenticity/integrity check decoder 218-2, at which the data can be authenticated using the authentication data (e.g., MAC) that were previously generated at the authenticity/integrity check encoder 218-1. In some embodiments, the authenticity/integrity check decoder 218-2 can calculate MAC based on TEE data, HPA, and the security key ID associated with a physical address to be accessed for executing a host read command. The MAC that is calculated during the read operation can be compared to the MAC transferred from (a location corresponding to the physical address of) the memory devices 226. If the calculated MAC and transferred MAC match, the UDB is written to the cache 212 (and further transferred to the host if needed). If the calculated MAC and transferred MAC do not match, the host is notified of the mismatch (and/or the poison).

The data (e.g., MTB) authenticated at the authenticity/integrity check decoder 218-2 and decrypted at the security decoder 217-2 can be transferred and written to the cache 212. In some embodiments, data can be further transferred from the cache 212 to the FCRC decoder 211-2, for example, in response to a read command received from the host (e.g., the host 103 illustrated in FIG. 1). As described herein, read and write commands of CXL memory systems can be a size of UDB, such as 64 bytes. For example, data can be requested by the host in a granularity of an UDB instead of an MTB. In this example, even if data transferred from the memory devices 226 are in a granularity of an MTB, data can be transferred from the cache 212 to the host in a granularity of an UDB. At the FCRC decoder 211-2, data (e.g., UDB) can be checked for any errors using CRC data that were previously generated at the FCRC encoder 211-1. The data decrypted at the FCRC decoder 211-2 can be further transferred to the host.

FIG. 3 is a functional block diagram of a memory controller 300 having an authenticity/integrity component (e.g., an authenticity/integrity check encoder/decoder 318-1/318-2 that are respectively shown as "AUTHENTICITY/INTEGRITY ENC" 318-1 and "AUTHENTICITY/INTEGRITY DEC" 318-2 in FIG. 3) and pairs of front-end CRC (alternatively referred to and shown as "FCRC" in FIG. 3) encoder/decoder 311-1 and 311-2 in another configuration in accordance with a number of embodiments of the present disclosure. The memory controller 300, the back end portion 319, and the memory devices 326 illustrated in FIG. 3 are analogous to the memory controller 100, the back end portion 119, and the memory devices 126 illustrated in FIG. 1.

The memory controller 300 can include a central controller portion 310, and a back end portion 319. The central controller portion 310 can include a FCRC encoder 311-1-1 paired with a FCRC decoder 311-1-2 and a FCRC encoder 311-2-1 paired with a FCRC decoder 311-2-2, the cache memory 312 coupled between the paired FCRC encoder/decoder 311-1 and FCRC encoder/decoder 311-2, the security encoder 317-1 paired with the security decoder 317-2, the authenticity/integrity check encoder 318-1 paired with the authenticity/integrity check decoder 318-2, the CRC encoder 313-1 paired with the CRC decoder 313-2, the LPCK encoder 314-1 paired with the LPCK decoder 314-2, and the ECC encoders 316-1-1, . . . , 316-1-X respectively paired with the ECC decoders 316-2-1, . . . , 316-2-X. A pair of security encoder/decoder 317, a pair of authenticity/integrity check encoder/decoder 318, a pair of CRC encoder/decoder 313, a pair of LPCK 314, respective pairs of ECC encoder/decoder 316 can be analogous to a pair of security encoder/decoder 217, a pair of authenticity/integrity check encoder/decoder 218, a pair of CRC encoder/decoder 213, a pair of LPCK 214, respective pairs of ECC encoder/decoder 216, as illustrated in FIG. 2. The back end portion 319 can include media controllers 321-1, . . . , 321-N and PHY memory interfaces 324-1, . . . , 324-N configured to be coupled to memory devices 326-1, . . . , 326-N via channels 325-1, . . . , 325-N.

FIG. 3 is analogous to FIG. 2, except that it includes additional circuitry to check any errors on the UDB using CRC data without transferring/storing the CRC to the memory device 326. For example, as illustrated in FIG. 3, the FCRC decoder 311-1-2 coupled between the cache 312 and the security encoder 317-1 (and/or the authenticity/integrity check encoder 318-1) can be configured to check any errors on an UDB stored in the cache 212 using error detection information (e.g., CRC data) generated at the FCRC encoder 311-1-1. Further, the FCRC encoder 311-2-1 coupled between the cache 312 and the security decoder 317-2 (and/or the authenticity/integrity check decoder 318-2) can be configured generate error detection information (e.g., CRC data) on an UDB to be transferred to the host (e.g., the host 103 illustrated in FIG. 1). The error detection information generated at the FCRC encoder 311-2-1 can be used at the FCRC decoder 311-2-2 to check any errors on an UDB transferred from the cache 312.

In some embodiments, the pairs of FCRC encoder/decoder 311-1 and 311-2 can be used just to check errors on data stored in the cache. Accordingly, error detection information used at the pairs of FCRC encoder/decoder 311-1 and 311-2 may not be transferred and written to the memory devices 326.

In a non-limiting example, an apparatus (e.g., the computing device 101 illustrated in FIG. 1) can include a memory controller (e.g., the memory controller 100, 200, and/or 300 illustrated in FIGS. 1, 2, and 3, respectively) and a number of memory devices (e.g., the memory devices 126, 226, and/or 326 illustrated in FIGS. 1, 2, and 3, respectively) coupled to the memory controller. The number of memory device can be configured to store a memory transfer block (MTB) in cypher text form as a result of being encrypted at the memory controller. The MTB can include a number of user data blocks (UDBs) that are individually received at the memory controller as part of respective write commands. The number of memory devices can be further configured to store authentication data (e.g., the MAC data 437, 537 illustrated in FIGS. 4A-4C and 5, respectively) generated at the memory controller based on plain text of the MTB (further based on TEE tag, HPA, and a security key ID associated with the write command, as described herein). The memory controller can be configured to perform a first error detection operation on the MTB using first error detection information (e.g., the CRC data 435 and/or 535 illustrated in FIGS. 4A-4C and 5, respectively) generated based on the cypher text of the MTB. The memory controller can be further configured to perform, to protect data integrity and authenticity of the MTB, an authentication operation on the MTB using authentication data. The memory controller can be further configured to perform a second error detection operation on an UDB of the MTB using second error detection information (e.g., the CRC data 433 illustrated in FIGS. 4A-4C) generated based on plain text of the UDB. In some embodiments, the MTB corresponds to a cache line size.

In some embodiments, the memory controller can be configured to write, to one of the number of memory devices, the second error detection information previously generated based on the plain text of the UDB. In this example, the memory controller can be further configured to cause the one of the number of memory devices to transfer the second error detection information to the memory controller to perform the second error detection operation. In some embodiments, the memory controller can be configured to generate, prior to the second error detection operation and to perform the second error detection operation, the second error detection information subsequent to the authentication.

In some embodiments, the memory controller can include an authenticity/integrity check decoder (e.g., the authenticity/integrity check decoder 218-2 and/or 318-3 illustrated in FIGS. 2 and 3, respectively) configured to perform the authentication operation on the MTB. The memory controller can further include a security decoder (e.g., the security decoder 217-2 and/or 317-3 illustrated in FIGS. 2 and 3, respectively) configured to decrypt the MTB to convert the cypher of the MTB to the plain text.

In some embodiments, the memory controller can further include a cache (e.g., the cache 212 and/or 312 illustrated in FIGS. 2 and 3, respectively) configured to store the MTB subsequent to the first error detection operation and the authentication operation being performed on the MTB. In some embodiments, the memory controller can be configured to cause the cache to transfer the UDB to an error detection decoder (e.g., the FCRC 211-2, 311-1-2, and/or 311-2-2 illustrated in FIGS. 2 and 3, respectively) configured to perform the second error detection operation to transfer the UDB to a host (e.g., the host 103 illustrated in FIG. 1) subsequent to the second error detection operation.

In some embodiments, the authentication data can be message authentication code (MAC) data. Further, the first error detection information, the first error detection information, or both, can be cyclic redundancy check (CRC) data.

In another non-limiting example, an apparatus e.g., the computing device 101 illustrated in FIG. 1) can include a number of memory devices and a memory controller (e.g., the memory controller 100, 200, and/or 300 illustrated in FIGS. 1, 2, and 3, respectively) coupled to the number of memory devices (e.g., the memory devices 126, 226, and/or 326 illustrated in FIGS. 1, 2, and 3, respectively). The memory controller can be configured to generate, in response to receipt of a first user data block (UDB), first error detection information (e.g., the CRC data 433 illustrated in FIGS. 4A-4C) based on plain text of the UDB to perform a first error detection operation on the UDB. The memory controller can be further configured to generate authentication data (e.g., the MAC data 437, 537 illustrated in FIGS. 4A-4C and 5, respectively) based on plain text of an MTB to protect data integrity and authenticity of the MTB. The MTB can correspond to a cache line size and includes a number of UDBs including the first UDB to perform an authentication operation on the MTB. The memory controller can be further configured to generate, to perform a second error detection operation on the UDB, second error detection information (e.g., the CRC data 435 and/or 535 illustrated in FIGS. 4A-4C and 5, respectively) based on cypher text of the MTB to perform a second error detection operation on the MTB. The memory controller can be further configured to write the MTB, the authentication data, and the second error detection information to the number of memory devices.

In some embodiments, the memory controller can be further configured to, in response to receipt of a read command to access the first UDB stored in one of the number of memory devices, cause the number of memory devices to transfer the MTB including the first UDB, the authentication data, and the second error detection information to the memory controller. In this example, the memory controller can be further configured to perform the second error detection operation on the MTB and the authentication operation on the MTB respectively using the second error detection information and the authentication data transferred from the number of memory devices.

In some embodiments, the memory controller can be further configured to write the first error detection information to the number of memory devices. In this example, the memory controller can be further configured to cause the number of memory devices to transfer the first error detection information to the memory controller to perform the first error detection operation on the UDB using the first error detection information transferred from the number of memory devices.

In some embodiments, the memory controller can further include a cache (e.g., the cache 212 and/or 312 illustrated in FIGS. 2 and 3, respectively). In this example, the memory controller can be configured to write the first UDB to the cache subsequent to the first error detection information being generated. Continuing with this example, the memory controller can be configured to cause the cache to transfer the MTB to an authenticity/integrity check encoder (e.g., the authenticity/integrity check encoder 218-1 and/or 318-1 illustrated in FIGS. 2 and 3, respectively) that is configured to generate the authentication data. Further, continuing with this example, the memory controller can be configured to cause the number of memory devices to transfer the MTB to the cache in response to a cache miss associated with the first UDB. Further, continuing with this example, the memory controller can further include a first error detection encoder (e.g., the FCRC encoder 311-1-1 illustrated in FIG. 3) coupled to a first side of the cache and configured to generate the first error detection information and a first error detection decoder (e.g., the FCRC decoder 311-1-2 illustrated in FIG. 3) coupled to a second side of the cache and configured to perform an error detection operation using the first error detection information.

In some embodiments, the memory controller can further include a security encoder (e.g., the security encoder 217-1 and/or 317-1 illustrated in FIGS. 2 and 3, respectively) configured to encrypt the MTB to convert the plain text of the MTB to the cypher text. Continuing with this example, the memory controller can further include an authenticity/integrity check encoder (e.g., the authenticity/integrity check encoder 218-1 and/or 318-1 illustrated in FIGS. 2 and 3, respectively) configured to generate the authentication data. In this example, the memory controller can be configured to operate the security encoder and the authenticity/integrity check encoder in parallel such that the security encoder and the authenticity/integrity check encoder operate based on a same input corresponding to the plain text of the MTB.

In some embodiments, the memory controller can be configured to write the first UDB to a first memory device of the number of memory devices. Further, the memory controller can be further configured to write the first error detection information to the first memory device.

Figure 4A:
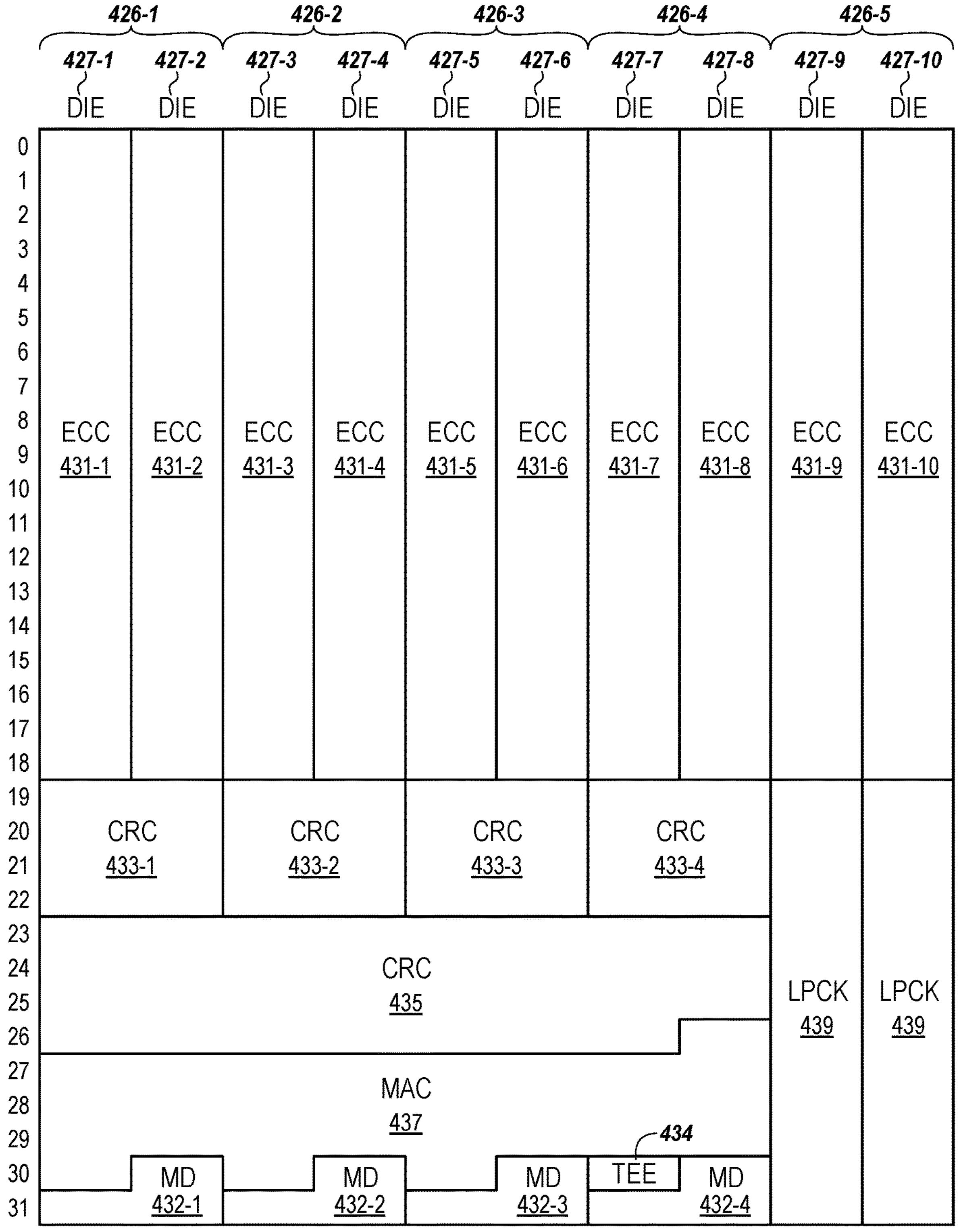
FIG. 4A-4C schematically illustrate various examples of how data of extra bits can be spread among memory devices in accordance with a number of embodiments of the present disclosure.
Figure 4B:
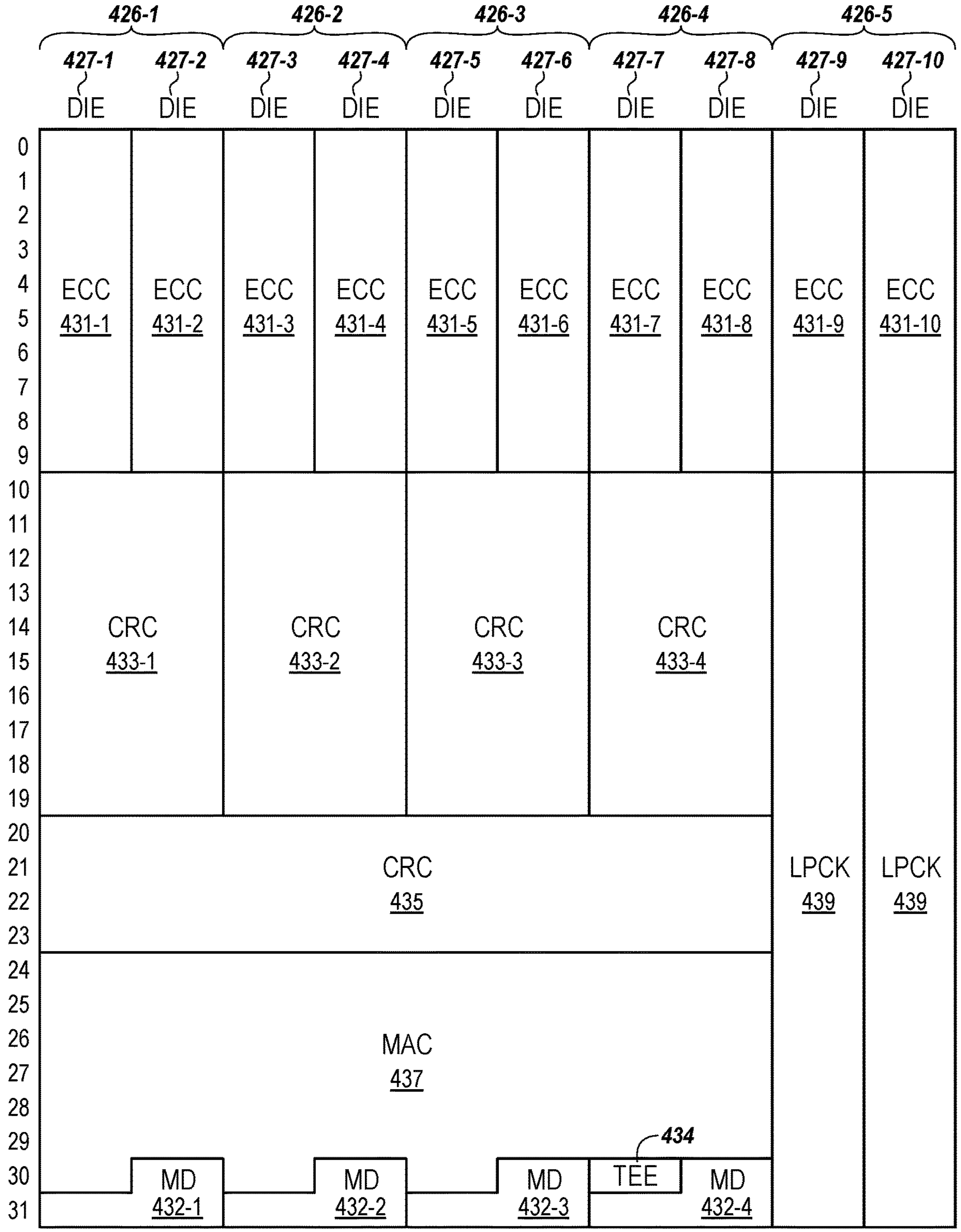
Figure 4C:
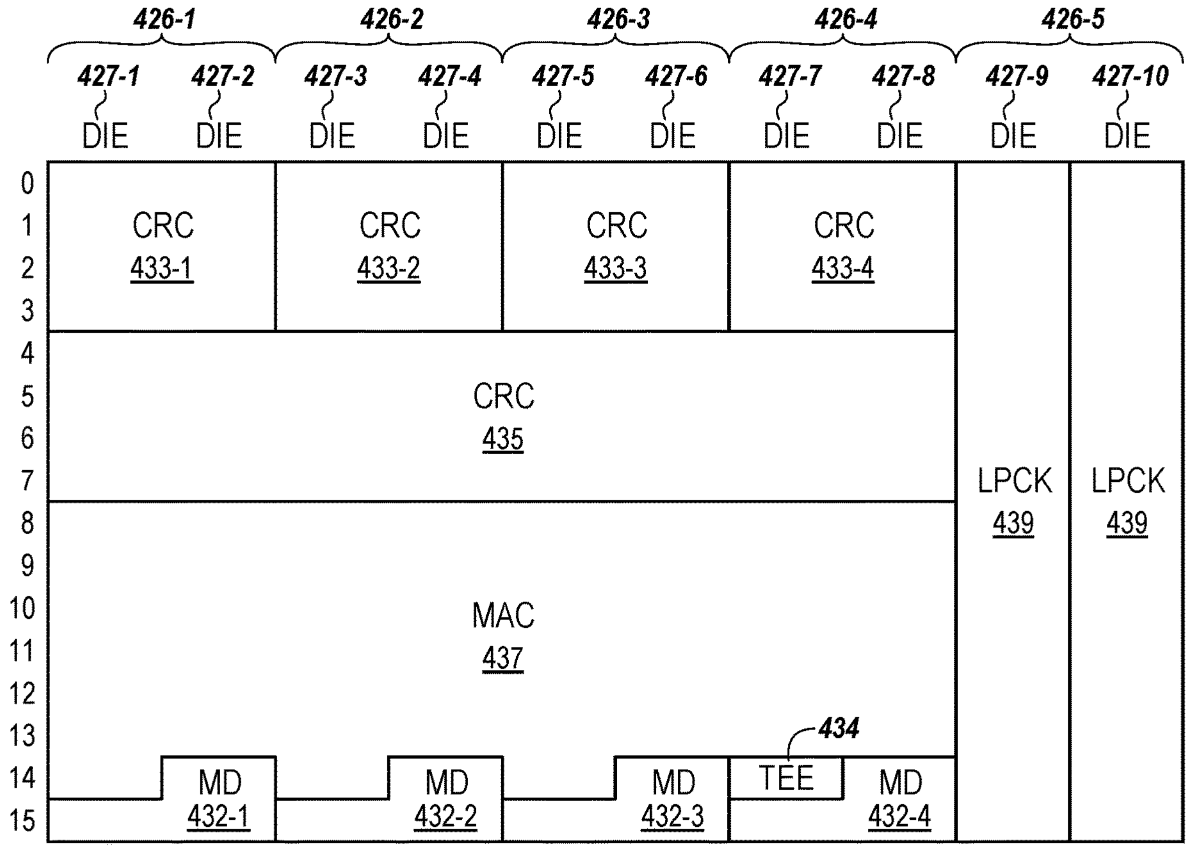

FIGS. 4A-4C schematically illustrate various examples of how extra bits can be spread among memory devices 426 in accordance with a number of embodiments of the present disclosure. The memory devices 426 can be analogous to memory devices 126 and/or 226 illustrated in FIGS. 1-2.

Each memory die (e.g., memory die 427) is not illustrated in its entirety in FIGS. 4A-4C and can further include other portions that are not illustrated in FIGS. 4A-4C. For example, each memory die 427 can further include the other portions not illustrated in FIGS. 4A-4C that are configured to store, for example, UDBs. In some embodiments, data stored in these "portions" of the memory dice 427 illustrated in FIGS. 4A-4C can be transferred via DMI pins.

As illustrated in FIGS. 4A-4C, each set of two memory dice 427 can be within a same memory device. For example, memory dice 427-1 and 427-2 are included in the memory device 426-1; memory dice 427-3 and 427-4 are included in the memory device 426-2; memory dice 427-5 and 427-6 are included in the memory device 426-3; memory dice 427-7 and 427-8 are included in the memory device 426-4; and memory dice 427-9 and 427-10 are included in the memory device 426-5. However, embodiments are not limited to a particular quantity of memory dice each memory device can include. Further, embodiments are not limited to a particular quantity of memory devices a memory system can include.

FIG. 4A schematically illustrates one example of how data of extra bits can be spread among memory devices in accordance with a number of embodiments of the present disclosure. As illustrated in FIG. 4A, UDBs can be stored over the memory devices 426-1 to 426-4, such as over memory dice 427-1 to 427-8. For example, a first UDB can be stored in the memory device 426-1 (e.g., in the memory dice 427-1 and 427-2); a second UDB can be stored in the memory device 427-2 (e.g., in the memory dice 427-3 and 427-4); a third UDB can be stored in the memory device 427-3 (e.g., in the memory dice 427-5 and 427-6); and a fourth UDB can be stored in the memory device 427-4 (e.g., in the memory dice 427-7 and 427-8). The memory device 426-5 (e.g., the memory dice 427-9 and 427-10) can be dedicated for storing LPCK parity data, not UDBs.

As illustrated in FIG. 4A, ECC data 431-1, . . . , 431-10 (e.g., alternatively referred to as error correction information) stored respectively in the memory dice 427-1, . . . , 427-10 can correspond to ECC data generated at ECC encoders 216-1. ECC data can be specific to a respective memory die such that ECC data stored in one memory die can be used (e.g., at a respective ECC decoder 216-2) to perform an error correction operation for correcting/detecting errors within data stored in that memory die. For example, an error correction operation (e.g., DECTED) can be performed on a memory die 427-1, . . . , 427-10 using the ECC data 431-1, . . . , 431-10, respectively.

As illustrated in FIG. 4A, CRC data 433-1, . . . , 433-4 (e.g., alternatively referred to as error detection information) stored respectively in memory devices 426-1 to 426-4 can correspond to CRC data generated at the FCRC encoder 211-1. CRC data 433 can be specific to a respective UDB such that CRC data stored in a same memory device 426 as one UDB can be used (e.g., at a respective FCRC decoder 211-2) to perform an error detection operation on the UDB. For example, an error detection operation can be performed on a memory device 426-1, . . . , 426-4 using CRC data 433-1, . . . , 433-4, respectively.

As illustrated in FIG. 4A, CRC data 435 (e.g., alternatively referred to as error detection information) stored over memory devices 426-1 to 426-4 (e.g., memory dice 427-1 to 427-8) can correspond to CRC data generated at the FCRC encoder 211-1. Unlike the CRC data 433, CRC data 435 can be specific to an MTB such that CRC data 435 stored over the memory devices 426 can be used (e.g., at a respective ECC decoder 213-2) to perform an error detection operation on an MTB (e.g., UDBs 0 to 4) stored over the memory devices 426. For example, an error detection operation can be performed on a MTB including UDBs using the CRC 435

As illustrated in FIG. 4A, MAC data 437 (e.g., alternatively referred to as authentication data) stored over memory devices 426-1 to 426-4 (e.g., memory dice 427-1 to 427-8) can correspond to authentication data generated at the authenticity/integrity check encoder (e.g., authenticity/integrity check encoder 218-1 illustrated in FIG. 2). MAC data can be specific to an MTB such that MAC data 437 stored over the memory devices 426 can be used to perform an authentication operation on an MTB (e.g., UDBs 0 to 4) stored over the memory devices 426.

As illustrated in FIG. 4A, LPCK data 439 (e.g., alternatively referred to as LPCK parity data) stored over memory device 426-5 (e.g., memory dice 427-9 and 427-10) can correspond to parity data generated at the LPCK encoder 214-1 to perform an LPCK operation on UDBs stored in the memory devices 427-1, . . . , 427-4.

As illustrated in FIG. 4A, metadata ("MD" as shown in FIG. 4A) 432-1, . . . , 432-4 stored respectively in memory devices 426-1 to 426-4 can correspond to meta data associated with respective UDBs. For example, the metadata 432-1 stored in the memory device 426-1 are associated with an UDB stored in the memory device 426-1; the metadata 432-2 stored in the memory device 426-2 are associated with an UDB stored in the memory device 426-2; the metadata 432-3 stored in the memory device 426-3 are associated with an UDB stored in the memory device 426-3; and the metadata 432-4 stored in the memory device 426-4 are associated with an UDB stored in the memory device 426-4. Further, the memory devices 426 can be configured to store TEE data 434, such as in the memory die 427-7 of the memory device 426-4 as illustrated in FIG. 4A.

As illustrated in FIG. 4A, each die 427 can include 19 bits of ECC data 431 (e.g., 38 bits of ECC data for each UDB), each memory device 426 (e.g., corresponding to an UDB) can include 8 bits of CRC data 433, the memory devices 426 (e.g., corresponding to an MTB or a cache line size) can include 31 bits of the CRC data 435, 28 bits of MAC data 437, 12 bits of metadata (e.g., 3 bits on each memory die 427), and 1 bit of TEE data 434.

FIG. 4B schematically illustrates another example of how data of extra bits can be spread among memory devices in accordance with a number of embodiments of the present disclosure. ECC data 431-1, . . . , 431-10, CRC data 433-1, . . . , 433-4, CRC data 435, MAC data 437, LPCK data 439, metadata 432, and TEE 434 illustrated in FIG. 4B can be analogous to the ECC data 431-1, . . . , 431-10, CRC data 433-1, . . . , 433-4, CRC data 435, MAC data 437, LPCK data 439, metadata 432, and TEE 434 illustrated in FIG. 4A.

As illustrated in FIG. 4B, each die 427 can include 9 bits of ECC data 431 (e.g., 18 bits of ECC data for each UDB), the memory devices 426 (e.g., corresponding to an MTB or a cache line size) can include 15 bits of the CRC data 435, 28 bits of MAC data 437, 12 bits of metadata (e.g., 3 bits on each memory die 427), and 1 bit of TEE data 434.

The memory devices 426 illustrated in FIG. 4B are analogous to those memory devices 426 illustrated in FIG. 4A, except that it includes fewer bits for each ECC data 431. As an example, each ECC data 431 illustrated in FIG. 4B can be configured to perform SECDED operation for a respective memory die 427, while each ECC data 431 illustrated in FIG. 4A can be configured to perform DECTED operation for a respective memory die 427. Instead, each CRC data 433 illustrated in FIG. 4B can include more bits than each CRC data 433 illustrated in FIG. 4A.

FIG. 4C schematically illustrates yet another example of how data of extra bits can be spread among memory devices in accordance with a number of embodiments of the present disclosure. CRC data 433-1, . . . , 433-4, CRC data 435, MAC data 437, LPCK data 439, metadata 432, and TEE 434 illustrated in FIG. 4B can be analogous to the ECC data 431-1, . . . , 431-10, CRC data 433-1, . . . , 433-4, CRC data 435, MAC data 437, LPCK data 439, metadata 432, and TEE 434 illustrated in FIG. 4A. The memory devices 426 at least partially illustrated in FIG. 4C can be of a type (e.g., LP5) different than those types (e.g., LP5A) of the memory devices 426 at least partially illustrated in FIGS. 4A and 4B.

As illustrated in FIG. 4C, each memory device 426 (e.g., corresponding to an UDB) can include 8 bits of CRC data 433, the memory devices 426 (e.g., corresponding to an MTB or a cache line size) can include 32 bits of the CRC data 435, 28 bits of MAC data 437, 12 bits of metadata (e.g., 3 bits on each memory die 427), and 1 bit of TEE data 434.

The memory devices 426 illustrated in FIG. 4C are analogous to those memory devices 426 illustrated in FIG. 4A, except that a size of each memory die 427 and/or memory device 426 illustrated in FIG. 4C is less than that illustrated in FIGS. 4A and 4B and the memory devices 426 are not configured to store ECC data 431 illustrated in FIG. 4A or 4B. Therefore, the memory controller 200 operating with extra bits stored as illustrated in FIG. 4C may disable the pairs of ECC encoders/decoders 216 and operate without performing error correction operations that would have been performed at the pairs.

Figure 5:
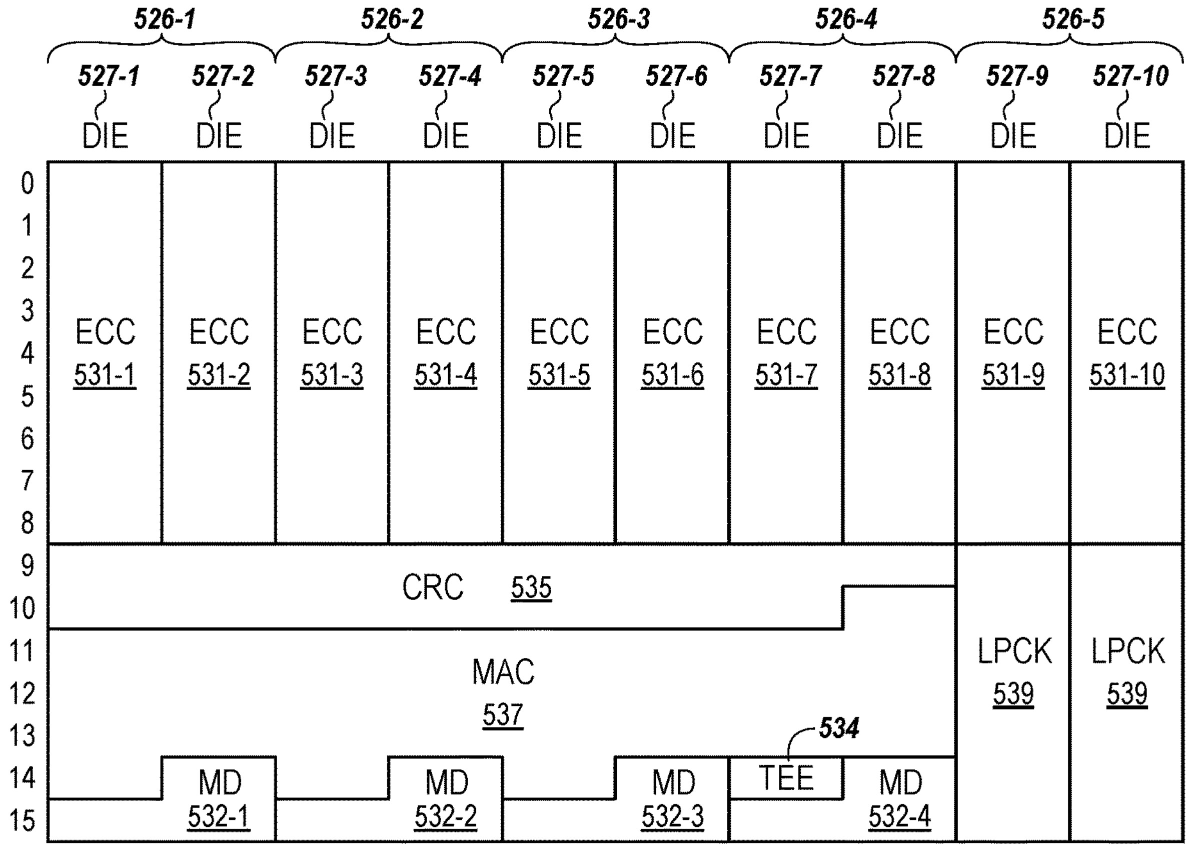
FIG. 5 schematically illustrates another example of how data of extra bits can be spread among memory devices in accordance with a number of embodiments of the present disclosure.

FIG. 5 schematically illustrates yet another example of how data of extra bits can be spread among memory devices 526 in accordance with a number of embodiments of the present disclosure. Each memory die (e.g., memory die 527) is not illustrated in its entirety in FIG. 5 and can further include other portions that are not illustrated in FIG. 5. For example, each memory die 527 can further include the other portions not illustrated in FIG. 5 that are configured to store, for example, UDBs. In some embodiments, data stored in these "portions" of the memory dice 527 illustrated in FIG. 5 can be transferred via DMI pins.

The memory devices 526 at least partially illustrated in FIG. 5 can be of a type (e.g., LP5) different than those types (e.g., LP5A) of the memory devices 426 at least partially illustrated in FIGS. 4A and 4B. As illustrated in FIG. 5, each set of two memory dice 527 can be within a same memory device. For example, memory dice 527-1 and 527-2 are included in the memory device 526-1; memory dice 527-3 and 527-4 are included in the memory device 526-2; memory dice 527-5 and 527-6 are included in the memory device 526-3; memory dice 527-7 and 527-8 are included in the memory device 526-4; and memory dice 527-9 and 527-10 are included in the memory device 526-5. However, embodiments are not limited to a particular quantity of memory dice each memory device can include. Further, embodiments are not limited to a particular quantity of memory devices a memory system can include.

ECC data 531-1, . . . , 531-10, CRC data 533-1, . . . , 533-4, CRC data 535, MAC data 537, LPCK data 539, metadata 532, and TEE 534 illustrated in FIG. 5 can be analogous to the ECC data 431-1, . . . , 431-10, CRC data 435, MAC data 437, LPCK data 439, metadata 432, and TEE 434 illustrated in FIG. 4A except that the ECC data 531-1, . . . , 531-10, CRC data 535, MAC data 537, and LPCK data 539 are generated respectively at the respective ECC encoders 316-1-1, . . . , 316-1-X, the CRC encoder 313-1, the authenticity/integrity check encoder 318-1, and the LPCK encoder 314-1, respectively.

As illustrated in FIG. 5, each die can include 9 bits of ECC data 531, the memory devices 526 (e.g., corresponding to an MTB or a cache line size) can include 15 bits of the CRC data 535, 28 bits of MAC data 537, 12 bits of metadata (e.g., 3 bits on each memory die 527), and 1 bit of TEE data 534.

The memory devices 526 illustrated in FIG. 5 are analogous to those memory devices 426 illustrated in FIG. 4C, except that the memory devices 526 are not configured to store e2e CRC data (e.g., the CRC data 431-1, . . . , 431-4 illustrated in FIG. 4C) that are generated at the FCRC encoder 211-1 and/or the FCRC encoder 311-1-1 illustrated in FIGS. 2 and 3, respectively. Instead, the memory devices 526 can be configured to store ECC data 531-1, . . . , 531-10 that were generated at the respective ECC encoders 316-1. Therefore, the memory controller 300 operating with extra bits stored as illustrated in FIG. 5 can perform error correction operations using the ECC encoders 316-1, as compared to the memory controller 200 operating with extra bits stored as illustrated in FIG. 4C (in which the error correction operations are not performed as the ECC encoders 216-1 are disabled).

Figure 6:
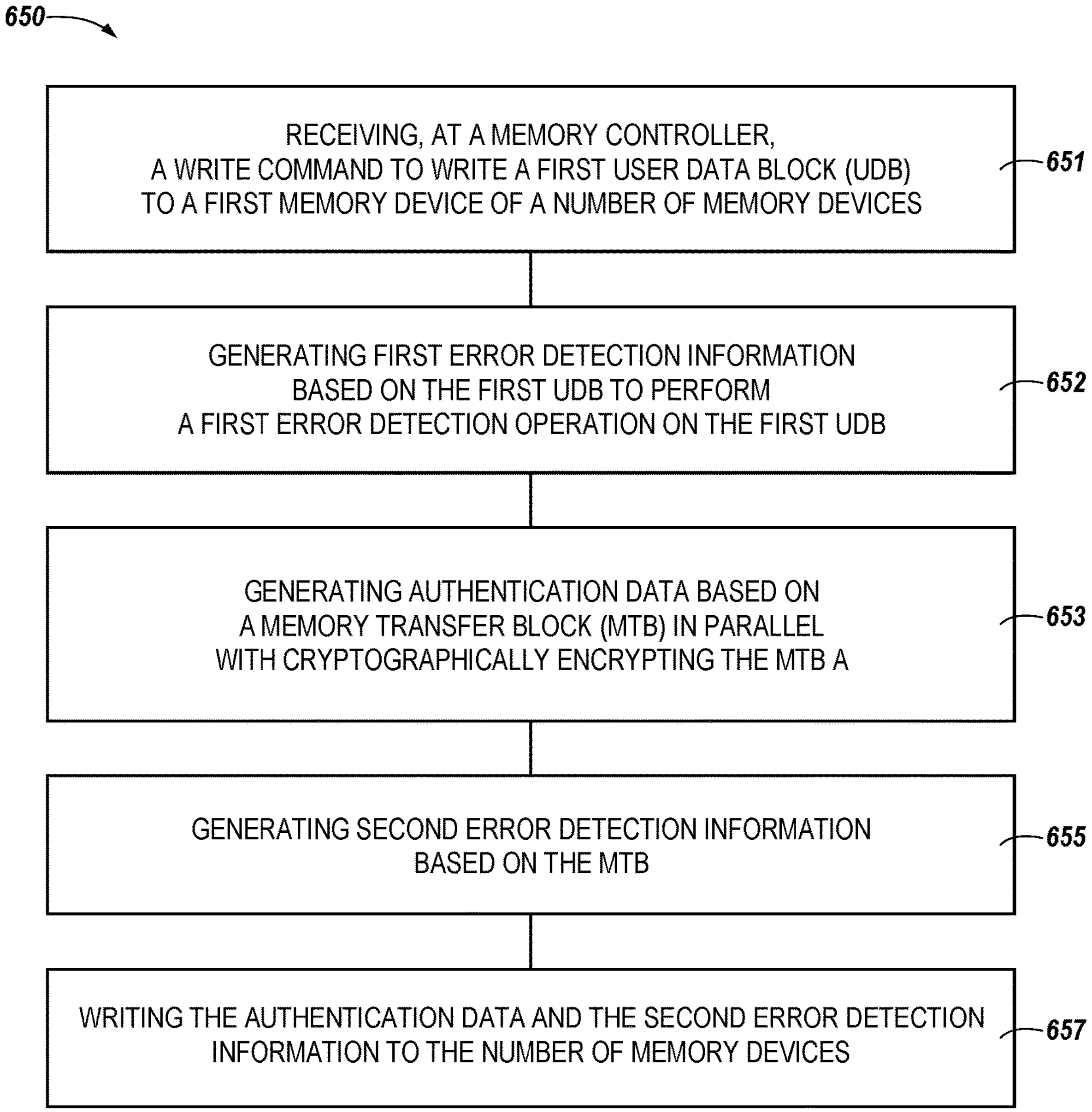
FIG. 6 is a flow diagram of a method for data authenticity and integrity check for data security schemes in accordance with a number of embodiments of the present disclosure.

FIG. 6 is a flow diagram 650 of a method for data authenticity and integrity check for data security schemes in accordance with a number of embodiments of the present disclosure. The method 650 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 650 is performed by the memory controller 100, 200, and/or 300 illustrated in FIGS. 1-3, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 651, a write command to write a first user data block (UDB) to a first memory device of a number of memory devices (e.g., the memory devices 126, 226, and/or 326 illustrated in FIGS. 1, 2, and 3, respectively) can be received at a memory controller (e.g., the memory controller 100, 200, and/or 300 illustrated in FIGS. 1, 2, and 3, respectively). At 653, first error detection information (e.g., the CRC data 433 illustrated in FIGS. 4A-4C) can be generated based on the first UDB to perform a first error detection operation on the first UDB.

In some embodiments, the memory controller can include a cache (e.g., the cache 212 and/or 312 illustrated in FIGS. 2 and 3, respectively). Continuing with this example, the first UDB can be written to the cache subsequent to generating the first error detection information and the first error detection operation can be performed (e.g., at the FCRC decoder 311-1-2 illustrated in FIG. 3) subsequent to transferring the first UDB from the cache and prior to writing the first UDB to the first memory device. Further, the first error detection operation can be performed on the first UDB without writing the first error detection information to one of the number of memory devices.

In some embodiments, the first error detection information can be written to one of the number of memory devices. In this example, the first error detection information can be subsequently transferred from the one of the number of memory devices to perform the first error detection operation on the first UDB using the first error detection information.

At 655, authentication data (e.g., the MAC data 437, 537 illustrated in FIGS. 4A-4C and 5, respectively) can be generated based on a memory transfer block (MTB) in parallel with cryptographically encrypting the MTB and to protect data integrity and authenticity of the MTB. The MTB can correspond to a cache line size and includes a number of UDBs including the first UDB. At 767, second error detection information (e.g., the CRC data 435 and/or 535 illustrated in FIGS. 4A-4C and 5, respectively) can be generated based on the MTB. At 657, the authentication data and the second error detection information can be written to the number of memory devices.

Figure 7:
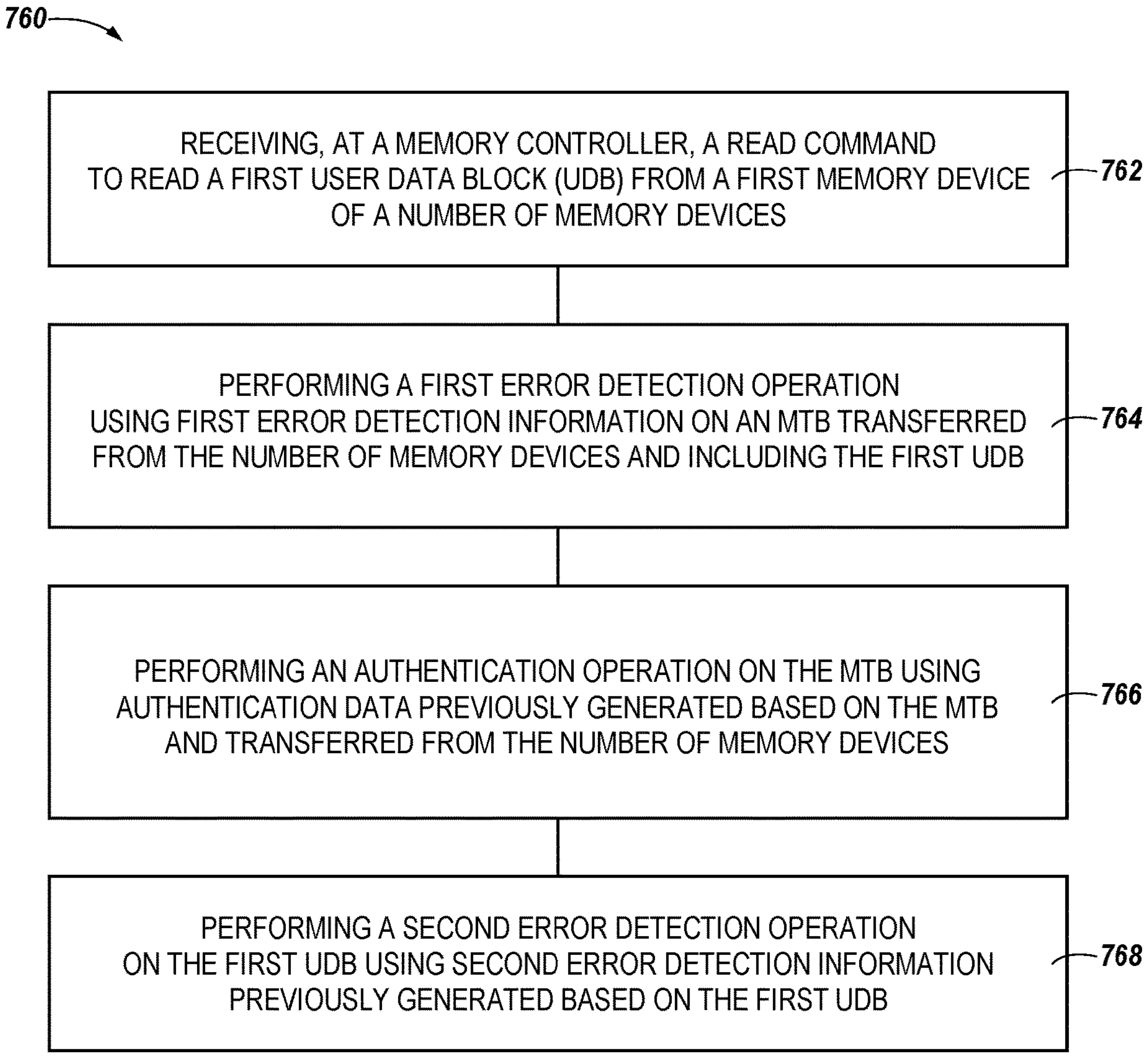
FIG. 7 is a flow diagram of a method for data authenticity and integrity check for data security schemes in accordance with a number of embodiments of the present disclosure.

FIG. 7 is a flow diagram 760 of a method for data authenticity and integrity check for data security schemes in accordance with a number of embodiments of the present disclosure. The method 760 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 760 is performed by the memory controller 100, 200, and/or 300 illustrated in FIGS. 1-3, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 762, a read command to read a first user data block (UDB) from a first memory device of a number of memory devices (e.g., the memory devices 126, 226, and/or 326 illustrated in FIGS. 1, 2, and 3, respectively) can be received at a memory controller (e.g., the memory controller 100, 200, and/or 300 illustrated in FIGS. 1, 2, and 3, respectively). At 764, a first error detection operation can be performed using first error detection information (e.g., the CRC data 435 and/or 535 illustrated in FIGS. 4A-4C and 5, respectively) on an MTB transferred from the number of memory devices and including the first UDB. The MTB can correspond to a cache line size. At 766, an authentication operation can be performed on the MTB using authentication data e.g., the MAC data 437, 537 illustrated in FIGS. 4A-4C and 5, respectively) previously generated based on the MTB and transferred from the number of memory devices to protect data integrity and authenticity of the MTB.

At 768, a second error detection operation can be performed on the first UDB using second error detection information (e.g., the CRC data 433 illustrated in FIGS. 4A-4C) previously generated based on the first UDB. In some embodiments, the second error detection information can be generated at the memory controller subsequent to performing the authentication operation on the MTB. In some embodiments, the second error detection information can be transferred from the first memory device to the memory controller to perform the second error detection operation using the second error detection information.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
- a number of memory devices including:
  - a first number of memory devices configured to store:
    - a memory transfer block (MTB) in cypher text form, the MTB including a number of user data blocks (UDBs) that are associated with at least two different write commands; and
    - authentication data generated based on plain text of the MTB; and
  - a number of second memory devices different than the first number of memory devices, the second number of memory devices configured to store a parity data block (PDB) configured for data recovery of one or more UDBs corresponding to at least a portion of the MTB; and
- a memory controller coupled to one or more of the number of memory devices and configured to:
  - perform a first error detection operation on the MTB using first error detection information generated based on cypher text of the MTB;
  - perform an authentication operation on the MTB using the authentication data; and
  - perform a second error detection operation on an UDB of the MTB using second error detection information generated based on plain text of the UDB.

2. The apparatus of claim 1, wherein the memory controller is configured to:
- write, to one of the number of memory devices, the second error detection information previously generated based on the plain text of the UDB; and
- cause the one of the number of memory devices to transfer the second error detection information to the memory controller to perform the second error detection operation.

3. The apparatus of claim 1, wherein the memory controller is configured to generate, prior to the second error detection operation and to perform the second error detection operation, the second error detection information subsequent to the authentication.

4. The apparatus of claim 1, wherein:

the memory controller comprises an authenticity and integrity check decoder configured to perform the authentication operation on the MTB; and the memory controller further comprises a security decoder configured to decrypt the MTB to convert the cypher text of the MTB to the plain text.

5. The apparatus of claim 4, wherein the memory controller is configured to:

decrypt the MTB prior to performing the authentication operation on the MTB; and perform the authentication operation based at least in part on the plain text of the MTB.

6. The apparatus of claim 1, wherein the MTB corresponds to a cache line size.

7. The apparatus of claim 1, wherein the memory controller further comprises a cache configured to store the MTB subsequent to the first error detection operation and the authentication operation being performed on the MTB.

8. The apparatus of claim 7, wherein the memory controller is further configured to cause the cache to transfer the UDB to an error detection decoder configured to perform the second error detection operation to transfer the UDB to a host subsequent to the second error detection operation.

9. An apparatus, comprising:

a number of memory devices; and a memory controller coupled to the number of memory devices, the memory controller configured to:

generate, in response to receipt of a first user data block (UDB), first error detection information based on plain text of the UDB to perform a first error detection operation on the UDB;

generate authentication data based on plain text of a memory transfer block (MTB), wherein the MTB corresponds to a cache line size and includes a number of UDBs that are associated with at least two different write commands, the number of UDBs including the first UDB to perform an authentication operation on the MTB;

generate, to perform a second error detection operation on the UDB, second error detection information based on cypher text of the MTB to perform a second error detection operation on the MTB;

generate a parity data block (PDB) based on the cypher text of the MTB, the PDB including parity data configured for data recovery of one or more UDBs corresponding to at least a portion of the MTB;

write the authentication data and the second error detection information to the number of memory devices;

write the MTB to a first number of memory devices of the number of memory devices; and write the PDB to a second number of memory devices of the number of memory devices different than the first number of memory devices.

10. The apparatus of claim 9, wherein the memory controller is configured to, in response to receipt of a read command to access the first UDB stored in one of the number of memory devices:

cause the number of memory devices to transfer the MTB including the first UDB, the authentication data, and the second error detection information to the memory controller; and perform the second error detection operation on the MTB and the authentication operation on the MTB respectively using the second error detection information and the authentication data transferred from the number of memory devices.

11. The apparatus of claim 10, wherein the memory controller is further configured to:

write the first error detection information to the number of memory devices; and cause the number of memory devices to transfer the first error detection information to the memory controller to perform the first error detection operation on the UDB using the first error detection information transferred from the number of memory devices.

12. The apparatus of claim 9, wherein the memory controller further comprises a cache, wherein the memory controller is configured to write the first UDB to the cache subsequent to the first error detection information being generated.

13. The apparatus of claim 12, wherein the memory controller is configured to cause the cache to transfer the MTB to an authenticity and integrity check encoder that is configured to generate the authentication data.

14. The apparatus of claim 12, wherein the memory controller further comprises:

a first error detection encoder coupled to a first side of the cache and configured to generate the first error detection information; and a first error detection decoder coupled to a second side of the cache and configured to perform an error detection operation using the first error detection information.

15. The apparatus of claim 9, wherein the memory controller further comprises:

a security encoder configured to encrypt the MTB to convert the plain text of the MTB to the cypher text; and an authenticity and integrity check encoder configured to generate the authentication data;

wherein the memory controller is configured to operate the security encoder and the authenticity and integrity check encoder in parallel such that the security encoder and the authenticity and integrity check encoder operate based on a same input corresponding to the plain text of the MTB.

16. The apparatus of claim 9, wherein the memory controller is configured to:

write the first UDB to a first memory device of the number of memory devices; and write the first error detection information to the first memory device.

17. A method, comprising:

receiving, at a memory controller, a write command to write a first user data block (UDB) to a first memory device of a number of memory devices;

generating first error detection information based on the first UDB to perform a first error detection operation on the first UDB;

generating authentication data based on a memory transfer block (MTB) in parallel with cryptographically encrypting the MTB, wherein the MTB corresponds to a cache line size and includes a number of UDBs that are associated with at least two different write commands, the number of UDBs including the first UDB;

generating second error detection information based on the MTB;

generating a parity data block (PDB) based on the MTB, the PDB including parity data configured for data recovery of one or more UDBs corresponding to at least a portion of the MTB;

writing the authentication data and the second error detection information to the number of memory devices;

writing the MTB to a first number of memory devices of the number of memory devices; and writing the PDB to a second number of memory devices of the number of memory devices different than the first number of memory devices.

18. The method of claim 17, wherein the memory controller further comprises a cache and the method further comprises:

writing the first UDB to the cache subsequent to generating the first error detection information; and performing the first error detection operation subsequent to transferring the first UDB from the cache and prior to writing the first UDB to the first memory device.

19. The method of claim 18, further comprising performing the first error detection operation on the first UDB without writing the first error detection information to one of the number of memory devices.

20. The method of claim 17, further comprising:

writing the first error detection information to one of the number of memory devices; and subsequently transferring the first error detection information from the one of the number of memory devices to perform the first error detection operation on the first UDB using the first error detection information.

* * * * *